April 13, 1965 R. O. BREDTHAUER 3,178,233
LOADING APPARATUS FOR BULK TRANSPORT SYSTEMS
Filed Aug. 28, 1963 2 Sheets-Sheet 1

RAYMOND O. BREDTHAUER
*INVENTOR.*

BY
*Roy V. Smith, Jr*
ATTORNEY

April 13, 1965 R. O. BREDTHAUER 3,178,233
LOADING APPARATUS FOR BULK TRANSPORT SYSTEMS
Filed Aug. 28, 1963 2 Sheets-Sheet 2

RAYMOND O. BREDTHAUER
INVENTOR.

BY Roy H. Smith, Jr.
ATTORNEY

United States Patent Office 3,178,233
Patented Apr. 13, 1965

3,178,233
LOADING APPARATUS FOR BULK
TRANSPORT SYSTEMS
Raymond O. Bredthauer, Houston, Tex., assignor to Hughes Tool Company, Houston, Tex., a corporation of Delaware
Filed Aug. 28, 1963, Ser. No. 305,142
3 Claims. (Cl. 302—16)

This invention relates to bulk transport systems and more particularly concerns an improved apparatus for mixing or loading solid particles in a fluid medium.

Interest has recently focused on the hydraulic method of transporting solid particles such as coal, gravel, sand, ores, etc., in pipelines. Solid particles when suspended in a fluid are easily transported in this manner, but it is difficult to initially mix the solids and the fluid. For example, solid particles tend to accumulate in groups in the mixing apparatus and clog the outlet ports. Once the mixing apparatus is clogged, the utility of the entire system is destroyed; therefore, a successful mixing apparatus is the foundation on which the system depends. The need for a simple and reliable mixing apparatus has existed for many years.

The exact nature of the mixing problem can be more easily understood by reviewing the mode of operation of a typical loading apparatus. Usually, this apparatus consists of a sealed lock hopper having a bell valve at its upper end for introducing solids, an inlet conduit to introduce fluid into the hopper, and an outlet conduit to emit the mixture of solids and fluid. In operation the solids are dumped into the hopper and then the bell valve is closed. Fluid is pumped through the inlet conduit into a sealed hopper, washing the solids from the hopper into the outlet conduit. Clogging or bridging of the particles frequently occurs, especially when a liquid is used as the fluid, either inside the hopper or inside the outlet conduit due to the cohesiveness of wet particles, the accumulation of wet particles in the outlet vicinity, and the resulting pressure differential in that area. Usually, bridging occurs over the terminal of the outlet conduit since that is the most restricted area in the outlet vicinity.

Ruel M. Donaho, Jr., has disclosed in his patent application entitled "Loading Apparatus for Bulk Transport Systems," Serial No. 298,185, filed July 29, 1963, an apparatus which overcomes the bridging problem to a large degree. He discovered that the bridging problem could be solved by disposing the inlet and outlet conduits in a hopper at an angle less than 180 degrees with respect to each other with adjacent conduit ends. He teaches that the non-parallel flow resulting from this disposition of the conduits promotes turbulence in the hopper, and consequently, the solids and fluid are mixed with greater effectiveness than was previously possible. Turbulence is also effective in preventing the formation of bridges in the hopper. Furthermore, the adjacent disposition of the conduit ends eliminates the problem of bridging near the end of the outlet conduit. The fluid flowing into the hopper from the outlet conduit sweeps across the end of outlet conduit, destroying bridges in that area.

He teaches that the conduits are preferably concentric, and that the inlet conduit surrounds the outlet conduit. The inlet conduit is preferably restricted at its end so that a jetting action is given to the incoming fluid. Obviously, the greater the incoming fluid velocity, the greater will be the diffusion of flow throughout the hopper.

Although the Donaho loading apparatus performs admirably under most conditions, the present invention speeds the mixing process and shortens the time required to empty the hopper under some conditions, particularly during the final stages of the mixing process when most of the solids have already been evacuated from the hopper.

It is an object of my invention to improve the concentric pipe loading apparatus by decreasing the time required to empty the solids from the hopper. Another object is to accomplish the improved results with an apparatus having no moving parts and little need for maintenance. Another object is to provide an apparatus useable with many hopper sizes and geometries. Another object is to provide a loading apparatus that is operable with many solid-fluid combinations. A further object is to shield the outlet and inlet conduits from solids as they are initially poured into the hopper and when the apparatus is operating so that the conduits are not jammed.

Broadly stated, the invention comprises a deflector or bonnet placed above the end of the outlet conduit to deflect solid particles into the outgoing stream of fluid, thereby increasing the speed at which solid particles are entrained in the outgoing fluid and removed from the hopper. Moreover, the deflector prevents solid particles from pouring directly into either the inlet or outlet conduits when the hopper is initially filled with solids, or from jamming the conduits when the apparatus is in operation.

Other objects and advantages of this invention will become apparent hereinafter and in the drawings in which.

In describing the preferred embodiment of the invention, specific terminology will be used for the sake of clarity. The invention is not limited to these specific terms, however, but includes all equivalents which operate in a similar manner to accomplish a similar result.

Figure 1:
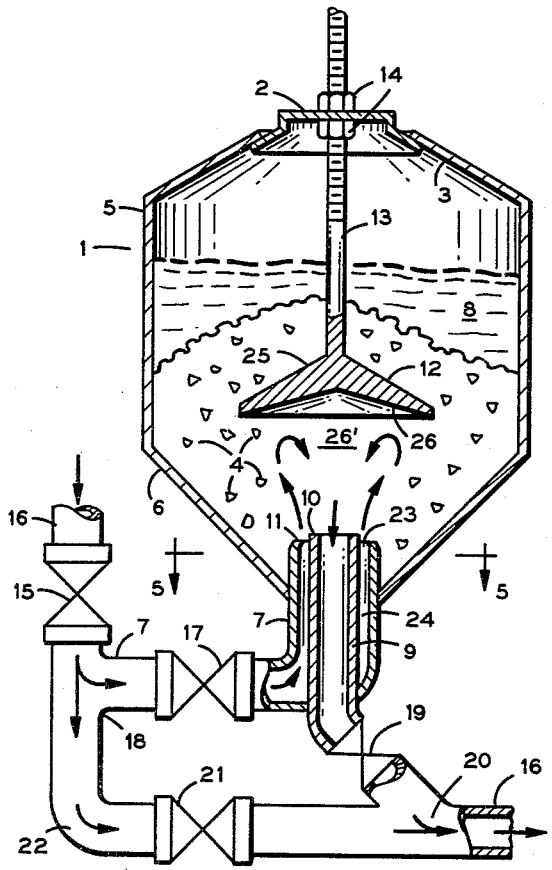
FIGURE 1 is an elevational view of a loading apparatus partially in section showing inlet and outlet conduits, a deflector suspended above them on a rod, and one arrangement of valves. The rod projects through and is in adjustable relationship with a bell valve at the upper end of the hopper to support the deflector.

Turning now to the specific embodiment illustrated in FIGURE 1, the numeral 1 designates a sealable chamber or hopper having a bell valve 2 which sealingly engages the upper conical portions 3 of the hopper, but which is opened, when desired, so that the solid particles 4 may be introduced. The hopper may have any desired geometry but as illustrated here is substantially cylindrical as shown by 5, having a lower conical portion 6 into which is inserted inlet conduit 7 through which the fluid 8 is introduced. The outlet conduit 9 of this embodiment is coaxially aligned with inlet conduit 7, the two conduits having ends designated respectively by numerals 10 and 11. Bonnet 12 is rigidly suspended above conduits 7 and 9 by rod 13 which projects through, and is in adjustable relationship with, bell valve 2. Lock nuts 14 are screwed aaginst bell valve 2 to fix the relationship between rod 13 and the bell valve.

The quantity and direction of fluid flow can be controlled by numerous valve arrangements, the one shown in FIGURE 1 being merely illustrative. As shown, master valve 15 is inserted in the primary flow line 16 to control the overall flow through the system. To control the flow into hopper 1, inlet valve 17 is inserted in inlet conduit 7 which is in turn connected to primary flow line 16 at 18. Similarly, outlet valve 19 is inserted in outlet conduit 9 which is connected to primary flow line 16 at 20, thus controlling the flow out of hopper 1. Finally, by-pass valve 21 is located in by-pass conduit 22.

In operation valve 15 is initially closed as are valves 17, 21 and 19 while solids 4 are introduced into hopper 1 through bell valve 2. Hopper 1 is filled to any desired level with solids 4, but it is preferable to leave some unfilled space at the top to permit some movement of solids upon the subsequent entry of fluid 8. After entry by the solids is completed, bell valve 2 is sealingly closed. Master valve 15 is opened as is by-pass valve 21 so that fluid flows past the point of communication 20 between outlet conduit 9 and by-pass conduit 22. This sequence of the operations is beneficial in drawing the solids 4 from outlet conduit 9 upon the subsequent opening of valve 19, thereby preventing the jamming of conduit 9 due to the rapid entry of solids. Then inlet valve 17 is opened and consequently, the fluid 8 begins to fill hopper 1. The pressure provided by a pumping means (not shown) connected to primary flow line 16 is exerted on the inside of the hopper and hence flow is directed toward and through outlet conduit 9. The flowing portions of fluid 8 entrain solid particles 4, the flow being preferably as large as possible so that a large volume of particles is activated. When the solids begin to flow, by-pass valve 21 is closed so that maximum flow passes through the hopper. After the solids are removed, by-pass valve 21 is opened and inlet valve 17 is closed. Outlet valve 19 is closed and bell valve 2 is opened to introduce more solids, and the operation described above is repeated.

The concentric arrangement of inlet and outlet conduits 7 and 9 of FIGURE 1 is the subject of the invention disclosed in the application of Donaho and prevents the bridging of solid particles 4 over outlet conduit terminal 10. If a bridge of solid particles tries to form near the outlet conduit terminal 10, the rapid upward flow of fluid discharging from the terminal 11 of inlet conduit 7 will remove it. Consequently, a bridge tending to form at a higher location in the hopper will be removed by the upward flow of fluid. The space 23 between conduits 7 and 9 at terminal 11 is preferably restricted with respect to the remainder of the space 24 between the conduits so that maximum velocity and turbulence are attained.

Laboratory tests indicated that little or no improvement could be shown over Donaho's invention when using extremely high flow rates. On the other hand, large improvements were shown when the flow rates were small. If the flow is large, and turbulence is diffused throughout the hopper, the solid particles are entrained with great speed, and the deflector does not necessarily speed the mixing process, but is nevertheless beneficial in preventing the conduits from clogging. Therefore, the invention has its greatest utility when the flow rate is limited, for in this situation, the deflector performs three beneficial functions: (1) it deflects the flow toward the outlet conduit vicinity as was previously stated, (2) it prevents jamming of the conduits when the solids are initially poured into the hopper, and (3) it assists in preventing the solids from jamming the conduits during the operation of the apparatus, that is, it keeps the total weight of the solids from pressing the particles down against the conduits.

The first function is illustrated clearly in FIGURE 1. Notice that the lower surface 26 of bonnet 12 converges toward the upper end of the hopper. This configuration deflects the fluid and the entrained solids toward the center of the hopper, or more specifically, toward the vicinity above outlet conduit 9. As a consequence, the solid particles 4 are quickly expelled from the hopper, instead of randomly circulating in divergent paths throughout the hopper.

This facet of the invention grows more important as more solids are expelled from the hopper. Obviously, increasing the space in the hopper leaves more room for random movement of the remaining particles, and the importance of having a deflector to guide these particles is increased. Tests comparing the performance of a hopper containing concentric conduits and a deflector, as shown in FIGURE 1, with a hopper having concentric conduits but no deflector, have substantiated this theory. In summary, the deflector speeds the expulsion of solid particles from the hopper, especially during the final stages of the mixing process.

The diameter of the deflector is determined with reference to two broad limits: (1) it should be larger than the diameter of the inlet conduit 7, and preferably is sufficiently large to engage and deflect the broadest and most diffused flow of the incoming fluid, but (2) it should not be so large as to restrict the downward movement of solids 4 past the wall of the hopper. These limits are, unfortunately, affected by other variables such as the size of the solid particles and the flow rate selected.

The second function of the deflector (the prevention of jamming of the conduits when the solids are initially poured into the hopper) is also apparent in FIGURE 1. Protecting the conduits from initially filling with solids frequently prevents clogging. If solids are not introduced into the outlet conduit until accompanied by a smooth flow of water, for example, there is a greater possibility that they will continue to flow smoothly into primary flow line 16.

The third function of the deflector (the prevention of jamming of the conduits during operation of the apparatus) is also illustrated in FIGURE 1 where solid particles 4 are shown pressing down against upper conical surface 25 of bonnet 12. As the hopper is emptied, part of the solids slide down this surface and ultimately contact the incoming fluid. Underneath deflecting surface 26 of the deflector is a space 26' which is free from relatively static solid particles. This space permits free movement of fluid and entrained solids toward outlet conduit terminal 10 without interference from the solids located above the bonnet, and keeps the bulk of the particles from pressing down against the conduits. The volume of this space depends on the distance separating outlet conduit terminal 10 and lower surface 26 of deflector 12. Experiments have shown that it is preferable that this distance be greater than twice the diameter of the outlet pipe. Some of the factors which affect this relationship are: The size of the hopper, the size of the solid particles, the amount of fluid available, and the type of fluid available. Since these are all variables, it is advisable to make the deflector adjustable in relationship to the conduit terminals, as is shown in FIGURE 1.

Figure 2:
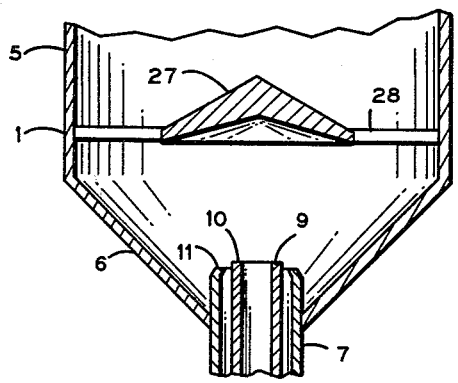
FIGURE 2 is a fragmentary elevational view in section showing the deflector attached to the hopper wall by a plurality of beams.
Figure 5:
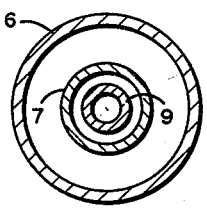
FIGURE 5 is a plan view in section taken as indicated by the lines and arrows 5—5 of FIGURE 1.

When usage of the apparatus for long periods of time under fixed operating conditions is expected, the position of the deflector may be fixed as is shown in FIGURE 2. Deflector 27 is merely secured to hopper walls 5 by a plurality of beams 28, and in other respects, is similar to deflector 12 of FIGURE 1.

Figure 3:
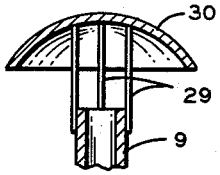
FIGURE 3 is a fragmentary elevational view illustrating an alternate deflector embodiment which is attached to the outlet conduit by a plurality of columns.

Another embodiment of the stationary deflector is shown in FIGURE 3 where vertical columns 29 connect outlet conduit 9 and deflector 30. The deflector shown here is a circular shell in cross section and illustrates that its exact shape is not critical, provided that its lower surface will deflect the flow toward the outlet vicinity.

Figure 4:
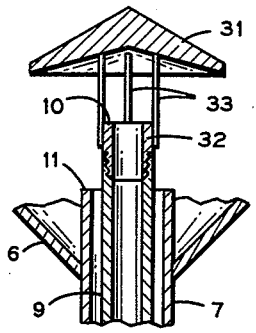
FIGURE 4 illustrates in fragmentary section an outlet conduit with a detachable end which supports the deflector.

FIGURE 4 illustrates a removable deflector 31 connected to a threaded extension 32 by a plurality of columns 33 which join the extension and the deflector. In this embodiment, as well as in those illustrated in FIGURES 1, 2 and 3, the outlet conduit 9 extends above the terminal 11 of inlet conduit 7. This feature is beneficial but is not essential to the practice of the invention. Its purpose, as is pointed out by Donaho, is to provide an upward flow of fluid underneath the terminal of the outlet conduit so that bridges of solids are removed if they try to form over the outlet terminal.

In the present invention, the extension of the outlet conduit above the inlet conduit has an additional purpose. It is beneficial for the fluid to travel an extended vertical distance before it reaches the outlet conduit so that it will contact and entrain numerous solid particles. However, if the distance separating the inlet and outlet is too great, excessive energy will be expended in lifting the said particles up to the outlet terminal. In this apparatus, as in all machines, it is advantageous to keep the energy requirements as low as possible to achieve economy. Hence, the distance separating inlet terminal 11 and outlet terminal 10 is determined by compromising these two opposing principles.

When the outlet conduit is extended beyond the inlet conduit as is illustrated in FIGURES 1, 2 and 4, more protection is afforded to the outlet conduit 9 by the deflector than to the inlet conduit 7 from the static solid particles. Fortunately, the inlet conduit needs less protection because the incoming flow of fluid discharging from its terminal can move the solids out of the way. In fact, its function is to emit fluid to engage and move the solid particles, and consequently, the fact that it receives less protection from the deflector than does the outlet conduit is not detrimental.

Figure 6:
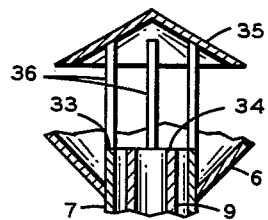
FIGURE 6 is a fragmentary elevational view in section showing an alternate disposition of the conduit terminals.
Figure 7:
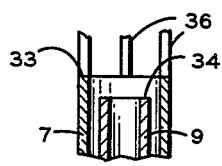
FIGURE 7 is another fragmentary elevational view in section illustrating another disposition of the terminals of the conduits.

Although it is preferable to extend the outlet conduit above the inlet conduit, the deflector may be used with apparatuses having the inlet and outlet terminals in the same plane. FIGURE 6, for example, illustrates the termination of the conduits on the same horizontal plane and at the lowest extremity of the hopper. Having inlet conduit 7 terminate at the lowest extremity of the hopper is beneficial in eliminating areas underneath inlet conduit terminal 33 where there is little flow. In the FIGURE 1 embodiment there are sometimes a few solid particles left in the hopper which are difficult to remove, but the FIGURE 6 arrangement remedies this. Similar to the FIGURES 2 and 3 embodiments, deflector 35 is secured to a conduit (in this case the inlet conduit 7) by a plurality of columns 36. Since terminals 33 and 34 are on the same plane, the columns 36 may be attached to either. FIGURE 7 illustrates an alteration having the outlet conduit terminal 34 below inlet conduit terminal 33. This alteration cannot be carried too far or else the fluid will flow directly from conduit 7 to conduit 9 without reaching the hopper. Columns 36 in this embodiment also carry and support a bonnet (not shown).

Figure 10:
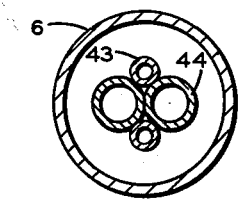
FIGURE 10 shows another embodiment of the inlet and outlet conduits.
Figure 11:
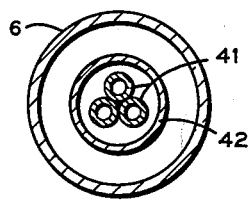
FIGURE 11 illustrates an embodiment having a plurality of inlet conduits placed inside the outlet conduit.
Figure 8:
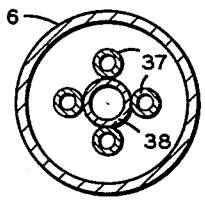
FIGURE 8 is a sectional plan view similar to FIGURE 5 showing an embodiment alternate from that of FIGURE 5 wherein the fluid inlet comprises a plurality of conduits surrounding the outlet condit.
Figure 12:
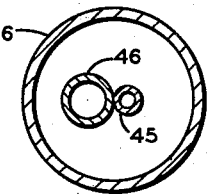
FIGURE 12 shows one inlet conduit and an adjacent outlet conduit.
Figure 9:
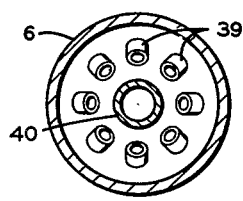
FIGURE 9 illustrates another embodiment which utilizes a plurality of jetting inlet conduits angularly disposed with respect to the outlet conduit longitudinal axis.
Figure 13:
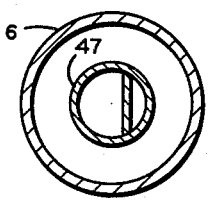
FIGURE 13 illustrates an inlet and outlet conduit formed by partitioning a single tubular member.

The exact number and form of conduits can be varied, because the invention is not limited to the concentric tubular arrangement shown in FIGURES 1 through 7. FIGURE 8 illustrates a plurality of inlet conduits 37 surrounding an outlet conduit 38. FIGURE 9 is an embodiment having an extension of this feature wherein a plurality of angularly disposed inlet jets 39 are disposed adjacent and around outlet conduit 40. The inlet jets are disposed inwardly but they may also be disposed to discharge slightly outwardly so that the fluid they emit strikes the outer areas of the deflector. The outward disposition is preferred so that a great volume of particles is touched by the incoming fluid. A variation of the theme is shown in FIGURE 11 where the inlet jets 41 are disposed inside the outlet conduit 42. FIGURE 10 shows two inlet conduits 43 and two outlet conduits 44. FIGURE 12 illustrates one inlet conduit 45 and an adjacent outlet conduit 46, and FIGURE 13 represents a similar device wherein the conduits are formed by partitioning a single conduit 47.

The particle size which can be used with the invention is controlled, for one thing, by the size of the outlet conduit. Clearly solids having a size approaching that of the outlet space available have a greater tendency to bridge. The particle size is also limited by the flow rate or the fluid. It is advisable to pump as much fluid as possible to the hopper since this increases the speed at which solid particles are entrained. It is at the lower flow rates, however, that the present invention produces the most outstanding results. Nevertheless, the flow rate must be sufficient to move solid particles toward the outlet.

As is clearly evident, there are many fluids, including air and other gases, which can be used with the invention. When pumping coal, it is usually sufficient to use water. Many bulk transport systems, however, use air to convey small particles. This invention may be used with all those fluids being presently used in bulk transport systems as far as is now known.

Although coal has been used primarily as the solid material, the invention may be used with any solid particles, subject only to the same limitations that face all bulk transport systems.

When continuous operation is desired, an arrangement of two or more hoppers having automatic valve mechanisms may be utilized so that when one hopper is being drained, another is being filled. This technique is well known in the art, however, and is mentioned merely to indicate the versatility of the invention.

I claim:

1. In a chamber for mixing solid particles and a fluid, said chamber having means to introduce the solids, at least one upwardly disposed inlet conduit connected to the lower end of the chamber, and at least one upwardly disposed outlet conduit adjacent the inlet conduit, the improvement comprising:
   (a) a deflector with an upwardly converging lower surface spaced above the conduits for deflecting the fluid and solids toward the outlet conduit and for protecting the conduits from the downward force of the relatively static solid particles; and
   (b) means for supporting the deflector inside the chamber.

2. In a lock hopper for mixing solid particles and a fluid, said hopper having means for initially introducing solids, an upwardly disposed inlet conduit connected to the lower end of the hopper, and an outlet conduit concentrically aligned inside the inlet conduit, both of the conduits having their terminals essentially adjacent and disposed in the lower portion of the lock hopper, the improvement comprising:
   (a) a deflector spaced above and concentrically aligned with the conduits to protect the conduits from being jammed by the downward force of the relatively static particles, said deflector having an upwardly converging lower surface for deflecting the fluid and solids toward the outlet conduit; and
   (b) means for supporting the deflector inside the lock hopper.

3. In a lock hopper for mixing solid particles and a fluid, said hopper having a bell valve at its upper end for introducing solids, an upwardly disposed inlet conduit connected to the lower end of the hopper, and an outlet conduit concentrically aligned inside the inlet conduit, the outlet conduit having its terminal above that of the inlet conduit, the improvement comprising:
(a) a deflector having an upwardly converging lower surface spaced above the conduits to deflect the solid particles toward the outlet conduit, and a diameter larger than that of the inlet conduit but smaller than that of the inside of the hopper so that solid particles will move downwardly in the hopper but will not jam the conduits; and
(b) means for supporting the deflector in the hopper.

References Cited by the Examiner

UNITED STATES PATENTS

| 2,518,811 | 8/50 | Nicholson | 302—53 |
| 2,667,448 | 1/54 | Munday | 302—53 |
| 2,957,493 | 10/60 | Nilsen | 302—16 |
| 3,121,593 | 2/64 | McIlvaine | 302—53 |

SAMUEL F. COLEMAN, *Primary Examiner.*
ANDRES H. NIELSEN, *Examiner.*